United States Patent
Frimmel et al.

(10) Patent No.: US 9,129,364 B2
(45) Date of Patent: Sep. 8, 2015

(54) LEVEL SET FUNCTION BASED IMAGE PROCESSING

(75) Inventors: Hans Frimmel, Uppsala (SE); Chunliang Wang, Linkoping (SE); Örjan Smedby, Uppsala (SE)

(73) Assignee: Novamia AB, Uppsala (SE)

( * ) Notice: Subject to any disclaimer, the term of this patent is extended or adjusted under 35 U.S.C. 154(b) by 234 days.

(21) Appl. No.: 13/984,704

(22) PCT Filed: Feb. 10, 2012

(86) PCT No.: PCT/SE2012/050134
§ 371 (c)(1),
(2), (4) Date: Oct. 14, 2013

(87) PCT Pub. No.: WO2012/108832
PCT Pub. Date: Aug. 16, 2012

(65) Prior Publication Data
US 2014/0029827 A1    Jan. 30, 2014

Related U.S. Application Data

(60) Provisional application No. 61/441,316, filed on Feb. 10, 2011.

(30) Foreign Application Priority Data

Feb. 10, 2011   (SE) ..................................... 1150106

(51) Int. Cl.
G06K 9/00         (2006.01)
G06T 7/00         (2006.01)
(52) U.S. Cl.
CPC ............ G06T 7/0012 (2013.01); G06T 7/0089 (2013.01); *G06T 2207/20161* (2013.01)

(58) Field of Classification Search
None
See application file for complete search history.

(56) References Cited

U.S. PATENT DOCUMENTS 8,571,278 B2 * 10/2013 Sonka et al. .................. 382/128
8,645,294 B1 *  2/2014 Owechko et al. ............... 706/14
(Continued)

OTHER PUBLICATIONS

Wang, Chunliang, Hans Frimmel, and Örjan Smedby. "Fast level-set based image segmentation using coherent propagation." Medical physics 41.7 (2014): 073501.*

(Continued)

*Primary Examiner* — Tahmina Ansari
(74) *Attorney, Agent, or Firm* — Fish & Richardson P.C.

(57) ABSTRACT

A method of processing input digital image data representing an image into output digital image data, comprising: providing (100) input image data; providing and initializing (200) a level set function representation for approximating the output digital image data; providing (300) a speed function; determining (400) a propagation direction trend map relating to image points of the level set function, said map comprising one or more trend directions associated with said image points so that each one of said image points has an associated trend direction; updating (500, 520) the level set function using the speed function and the propagation direction trend map, so that the speed function is excluded from contributing in the updating of the level set function in image points for which the speed of the speed function is not in the associated trend direction; and providing (700) the output digital image data based on the level set function. By the exclusion, propagation in a coherent manner is enabled and speed penalty owing to local wiggling as observed in conventional methods can be avoided.

34 Claims, 8 Drawing Sheets

(56) References Cited

U.S. PATENT DOCUMENTS

| | | | |
|---|---|---|---|
| 2006/0093197 A1* | 5/2006 | Unal et al. | 382/128 |
| 2006/0123050 A1* | 6/2006 | Carmichael et al. | 707/104.1 |
| 2007/0136034 A1* | 6/2007 | Kim et al. | 703/2 |
| 2008/0260221 A1* | 10/2008 | Unal et al. | 382/128 |
| 2014/0029827 A1* | 1/2014 | Frimmel et al. | 382/131 |

OTHER PUBLICATIONS

International Search Report and Written Opinion in International Application PCT/SE2012/050134, May 25, 2012, 7 pages.

Adalsteinsson and Sethian, "A Fast Level Set Method for Propagating Interfaces," J Computational Physics, 1995, 118:269-277.

Chen et al., "Using prior shapes in geometric active contours in a variational framework," International J Computer Vision, 2002, 50(3):315-328.

Deschamps and Cohen, "Fast extraction of tubular and tree 3D surfaces with front propagation methods," Pattern Recognition, Proceedings 16$^{th}$ Int'l Conference on Quebec City, Aug. 11-15, 2002, 4 pages.

Gerig et al., "Nonlinear anisotropic filtering of MRI data," Medical Imaging, IEEE Transactions, Jun. 1992, 11:221-232.

Leventon et al., "Statistical shape influence in geodesic active contours," in Computer Vision and Pattern Recognition, 2000. Proceedings. IEEE Conference on, 2002, 11:316-323.

Mallet et al., "Modeling wildland fire propagation with level set methods," Computers Mathematics with Applications, Apr. 1, 2009, 57(7):1089-1101.

Manniesing et al., "Level set based cerebral vasculature segmentation and diameter quantification in CT angiography," Medical Image Analysis, 2006, 10(2):200-214.

Manniesing et al., "Skeletonization for reinitialization in level-set-based vascular tree segmentation," Progress Biomed Optics and Imaging, Feb. 16, 2004, 5370:506-514.

Osher and Fedkiw, "Level set methods and dynamic implicit surfaces", Springer 2003, chapter 11-12, 21 pages.

Taheri et al., "Level-set segmentation of brain tumors using a threshold-based speed function," Image and Vision Computing, Jan. 1, 2010, 28(1):26-37.

Tsai et al., "A shape-based approach to the segmentation of medical imagery using level sets" IEEE Transactions on Medical Imaging, Feb. 2003, 22(2):137-154.

Whitaker, "A level-set approach to 3d reconstruction from range data," International J Computer Vision, 1998, 29:203-231.

Yushkevich et al., "User-guided 3D active contour segmentation of anatomical structures: significantly improved efficiency and reliability," Neuroimage, 2006, 31(3):1116-1128.

* cited by examiner 1. initialize level set function $\phi(x)$
2. initialize $status(x) = active$ for all $x \in C$
3. initialize $wigglingcounter(x) = 0$ for all $x \in C$
4. do
5.    $\phi_{old} = \phi$
6.    calculate $trend(x) = sign(\sum_{s \in N(x,r_1)} v(s))$ for all $x \in C$.
7.    coherentpropagation($\phi$, $trend$, $status$)
8.    $isallstationary$=checkforstationary($\phi_{old}$, $\phi$, $wigglingcounter$, $status$, $\varepsilon$, $n$)
9. while ($isallstationary \neq$ Yes)

Fig. 3a

Function coherentpropagation($\phi$, $trend$, $status$):
1. do
2.   $changed\_list.empty()$
3.   for all $x \in C$ and $status(x) = active$
4.     calculate $v(x)$
5.     if $trend(x) = sign(v(x))$
6.       $\phi(x) = \phi(x) + v(x)*\Delta t$
7.       $changed\_list.add(x)$
8.     else
9.       $status(x) = sleep$
10.     end if
11.   end for
12.   for all $x \in changed\_list$
13.     for all $s \in N(x,r_2)$
14.       $status(x) = active$
15.     end for
16.   end for
17. while($changed\_list.isnotempty()$)

Fig. 3b

Function checkforstationary( $\phi_{old}, \phi$, variation, status, $\varepsilon$, $n$ ):
1. $\Delta \phi = |\phi - \phi_{old}|$
2. *isallstationary* = YES
3. for all $x \in C$ and *status(x)* = *sleep*
4.    *isallstationary* = NO
5.    if $\Delta \phi (x) < \varepsilon$
6.       *wigglingcounter(x)* = *wigglingcounter(x)* + 1
7.    else
8.       *wigglingcounter(x)* = 0
9.    end if
10.   if *wigglingcounter(x)* > $n$
11.      $\phi(x) = (\phi(x) + \phi_{old}(x))/2.0$
12.      *status(x)* = *stopped*
13.   end if
14. end for
15. return *isallstationary*

Fig. 3c

LEVEL SET FUNCTION BASED IMAGE PROCESSING

CROSS-REFERENCE TO RELATED APPLICATION

This application is a National Stage Application under 35 U.S.C. §371 and claims the benefit of International Application No. PCT/SE2012/050134, filed Feb. 10, 2012, which claims priority to Sweden Appln. No. 1150106-1, filed on Feb. 10, 2011 and to U.S. Appln. No. 61/441,316, filed on Feb. 10, 2011. The disclosure of the foregoing applications are hereby incorporated by reference in their entirety.

TECHNICAL FIELD

The present disclosure relates generally to level set function based image processing.

TECHNICAL BACKGROUND

Object segmentation is often needed in medical image analysis, e.g., for surgery planning or for quantitative measurements of vessel stenosis. Although there are many segmentation methods in the literature, many of them fail to give satisfactory result when the image resolution is limited or has relatively high noise content. These difficulties can sometimes be overcome by user intervention, but this often results in complicated workflows and long analysis time. The level-set method, invented in the 1980s, is for example known for use as an image segmentation tool, due to its ability to automatically handle complicated topological changes of the targeted object, keep the contour smooth on a noisy background and generate segmentation results with sub-voxel accuracy. For an introduction see e.g. Osher, S., and Fedkiw, R. P., "*Level set methods and dynamic implicit surfaces*", Springer (2003). Many studies have shown that the level-set technique improves the segmentation accuracy and reduces the need for user supervision, such as Yushkevich, P. A., Piven, J., Hazlett, H. C., Smith, R. G., Ho, S., Gee, J. C., and Gerig, G., "*User-guided 3D active contour segmentation of anatomical structures: significantly improved efficiency and reliability,*" Neuroimage 31(3), 1116-1128 (2006), and Manniesing, R., Velthuis, B. K., Van Leeuwen, M. S., Van der Schaaf, I. C., Van Laar, P. J., and Niessen, W. J., "*Level set based cerebral vasculature segmentation and diameter quantification in CT angiography,*" Medical Image Analysis 10(2), 200-214 (2006). Despite the success and robustness achieved in various experimental environments, its application in clinical practice is still rather limited, mainly due to the long computation time. Several methods have been proposed to accelerate the level-set method; for example Sethian et al invented the narrow-band method, in which the computation of the level-set function is limited to a band a few pixels wide instead of the whole image, see Adalsteinsson, D., Adalsteinsson, D., Sethian, J. A., and Sethian, J. A., "*A Fast Level Set Method for Propagating Interfaces,*" JOURNAL OF COMPUTATIONAL PHYSICS 118, 269-277 (1994). Whitaker later extended narrow-band level set to the sparse field level set, where the narrow band is only one pixel wide and the level set function is recalculated with a distance transform in each iteration, see Whitaker, R. T., "*A level-set approach to 3d reconstruction from range data,*" INTERNATIONAL JOURNAL OF COMPUTER VISION 29, 203-231 (1998). However, in many applications these methods do not give satisfactory performance, as segmentation takes too long. Hence it would be desirable with a level set based image segmentation method that allows for faster segmentation. In general it would be desirable with a level set based image processing method that would allow for faster execution, that is, not only in the case of image segmentation but also in other situations where level set methods can be employed in image processing, for example when used for noise reduction.

SUMMARY OF THE INVENTION

In view of the above, an object of this disclosure is to present a solution overcoming or at least alleviating problems in the prior art, or to at least present an alternative solution. A more specific object is to present a level set function based image processing method that enables faster execution than conventional level set function based image processing methods. The invention is defined by the appended independent claims.

Hence, according to a first aspect there is provided a method of processing input digital image data representing an image into output digital image data, comprising the following steps: providing input image data; providing and initializing a level set function representation for approximating the output digital image data; providing a speed function; determining a propagation direction trend map relating to image points of the level set function, said map comprising one or more trend directions associated with said image points so that each one of said image points has an associated trend direction; updating the level set function using the speed function and the propagation direction trend map, so that the speed function is excluded from contributing in the updating of the level set function in image points for which the speed of the speed function is not in the associated trend direction; and providing the output digital image data. The output digital image data being based on the level set function after it has been updated. By the exclusion, propagation in a coherent manner is enabled and speed penalty owing to local wiggling as observed in conventional methods can be avoided.

By trend direction is here meant a direction towards which the speed function is predicted to contribute.

By image points of the level set function is here meant image points for which the level set function is defined, which e.g. can be over the whole image or partially, such as in a narrow band.

It should be understood that the propagation direction trend map may comprise one trend direction associated with all of said image points, trend directions where each one is associated with a respective group of said image points, and/or trend directions where each one is associated with a respective individual of said image points. It should further be understood that the steps of the method are not limited to be carried out according to the order of presentation herein.

The step of updating the level set function may be repeated at least once and/or until a propagation criterion is fulfilled.

The propagation criterion is typically application specific and chosen so that the repeating will stop after the level set function has been sufficiently updated in view of the application and requirements connected to it. A period in the method starts by determining the propagation trend map and ends when the step of updating the level set function has been repeated until the propagation criterion is fulfilled. Hence, during updates in one and the same period, the propagation direction trend map may be the same. When the propagation criterion is fulfilled, that is, when propagation under influence of the current propagation direction trend map is considered sufficient, the period ends.

The propagation criterion may be based on how many image points are being excluded in the step of updating the level set function and/or the number of iterations being performed in the step of updating the level set function. Fulfilling the propagation criterion may comprise that a predetermined or user input determined amount of image points is excluded in the step of updating the level set function and/or that a predetermined or user input determined number of iterations is performed in the step of updating the level set function. The step of updating the level set function may further comprise that image points for which the speed of the speed function is not in the associated trend direction are being excluded in the updating of the level set function. By the exclusion in the updating of the level set function using the propagation direction trend map, unnecessary calculations can be avoided.

In some embodiments the step of updating the level set function comprises that the level set function of an image point that would be excluded is still updated using the speed function if such image point is located in a local neighborhood of an image point that was updated, preferably by having speed in its associated trend direction. By local neighborhood of an image point is meant all image points within a determined distance from said image point, which distance may be predetermined or user input determined.

The propagation direction trend map may be at least initially determined through user input or may initially be predetermined.

The one or more trend directions of the propagation direction trend map may be determined by calculation based on values of the speed function, and/or be calculated using the sign of speed determined by the speed function. The one or more trend directions of the propagation direction trend map may be calculated based on values of the speed function in associated image points and/or in a local neighborhood thereof. Note that local neighborhood here has the same base definition as the local neighborhood discussed above, but that these local neighborhoods are not the same and may thus be of different size. Here it may involve points within a 1-point radius up to every point of the level set function. In the latter case there will be a unified propagation direction trend map.

The propagation direction trend map may comprise one trend direction associated with all or a group of said image points. Such trend direction is thus a trend direction that is common for multiple image points, and hence fewer directions have to be separately stored and handled in an implementation, which in turn enable speed-improvements.

The method may comprise a further step of: repeating the step of determining the propagation direction trend map and the step of updating the level set function at least once. It is understood that this step should be performed before providing the output digital data image in the step of repeating the step of determining the propagation direction trend map and the step of updating the level set function. By the repeating a next period start by (re)determining the propagation direction trend map. This way there may be coherent propagation in a first trend direction within first period and coherent propagation in a second trend direction within a second period, e.g. so that a whole, or segments, of a contour, expand in one period and shrink in the next.

The (re)determining of the propagation direction trend map following the repeating in the step of repeating the step of determining the propagation direction trend map and the step of updating the level set function, may comprise changing at least one of the one or more trend directions and the changing may involve switching to opposite direction, such as by switching sign of values representing the one or more trend directions.

The repeating in the step of repeating the step of determining the propagation direction trend map and the step of updating the level set function may involve that image points fulfilling an image point convergence criterion are being excluded from the updating. The use of the propagation trend makes it possible to determine convergence of individual points and thus the steps of (re)determining the propagation direction trend map and updating of the level set function etc, can be (re)performed excluding points considered to already have converged, which contributes to faster execution.

The image point convergence criterion may be fulfilled when the level set function has changed less than a threshold value, preferably being predetermined or user input determined, during one or more previous updates.

In some embodiments, the step of repeating the step of determining the propagation direction trend map and the step of updating the level set function further comprises setting the level set function for all image points of the level set function or image points fulfilling the image point convergence criterion to a value based on recent level set function values, such as an average of a present and a preceding level set function value.

The step of repeating the steps of determining the propagation direction trend map and the step of updating the level set function may be repeated at least once or until a level set function convergence criterion is fulfilled.

The level set function convergence criterion may be fulfilled based on how many, preferably that substantially all, image points of the level set function are fulfilling the image point convergence criterion and/or the number of iterations performed in the step of repeating the step of determining the propagation direction trend map and the step of updating the level set function.

Fulfilling the level set function convergence criterion may comprises that a predetermined or user input determined amount of image points of the level set function are fulfilling the image point convergence criterion and/or that a predetermined or user input determined number of iterations have been performed in the step of repeating the step of determining the propagation direction trend map and the step of updating the level set function.

The method of processing input digital image data representing an image into output digital image data may be an image segmentation method, wherein the output digital image data may represent a boundary of an object in the image represented by the input digital image data. The level set function may be updated only in a subset of image points, such as in a in a narrow band, comprising the 0-level.

The step of updating the level set function may further comprise detecting new image points added to the subset, updating the propagation direction trend map in regard of the new points and inheriting one or more trend directions to be associated with the new image points from neighboring image points for which the level set function were updated and thereby caused the new image points to be added to the subset. This way the entire propagation direction trend map need not be updated, yet allowing any new point added to the narrow band to get an associated trend direction and be updated in any subsequent iteration involving the step of updating the level set function.

The propagation criterion may be considered fulfilled when new image points have been added to the subset by the updating in the step of updating the level set function. By this there will be (re)determination of the propagation direction trend map such that any new point added to the subset will get an associated trend direction and can be updated in any subsequent iteration involving the step of updating the level set function.

The method may further comprise a step of providing a shape prior; and the step of updating the level set function may further comprise computing a transformed shape based on the shape prior and using the transformed shape in the updating of the level set function. The method is advantageously used in shaped based image segmentation, which conventionally is comparatively slow, and is therefore of particular interest to speed up using the present method. The step of updating the level set function may further comprise computing the transformed shape in image points for which the speed of the speed function is not in the associated trend direction. This utilizes the fact that image points having speed that is not in the trend direction are potentially such that may be closer to convergence, that is, closer to the border in case of segmentation, and it has greater effect and makes more sense to calculate transformed shape for such points. Image points farther away, i.e. typically such that have speed in the trend direction and/or for such which the level set function is being updated, may be omitted when computing the transformed shape.

In the step of updating the level set function, a decision to start computing the transformed shape may be based on whether there has been any change, or any substantial change, in the speed of image points in relation to their associated trend directions, compared to a previous iteration. No change means that there is no or very small effect in computing a transformed shape (again) and calculations in this regard can be omitted. By substantial change is meant that calculations also can be omitted if there is only one or a few points that have changed, or any other small amount of changed points that anyhow would have small shape changing effect. What is substantial in a specific case can be determined by the skilled person.

The method of processing input digital image data representing an image into output digital image data may be an image noise reduction method, wherein the output digital image data may represent a smoothed, noise reduced, image of the image represented by the input digital image data.

According to a second aspect there is provided a computer program product, loadable into the internal memory of a computer, comprising software for controlling steps of the method discussed above when said computer program product is run on the computer. According to a third aspect there is provided a computer readable medium having a program recorded thereon, where the program is arranged to make a computer control steps of the method discussed above when the program is loaded into the computer. According to a fourth aspect there is provided a computer configured to execute steps of the method discussed above. According to a fifth aspect there is provided a medical imaging system, such as magnetic resonance imaging system or a computerized tomography imaging system, having integrated the computer according to the fourth aspect.

According to a sixth aspect there is provided a computer for processing input digital image data representing an image into output digital image data, wherein the computer is configured to: Provide input image data. Provide and initialize a level set function representation for approximating the output digital image data. Provide a speed function. Determine a propagation direction trend map relating to image points of the level set function, said map comprising one or more trend directions associated with said image points so that each one of said image points has an associated trend direction. Update the level set function using the speed function and the propagation direction trend map, so that the speed function is excluded from contributing in the updating of the level set function in image points for which the speed of the speed function is not in the associated trend direction.

The computer may be further configured to provide the output digital image data image based on the level set function.

BRIEF DESCRIPTION OF THE DRAWINGS

The above, as well as other aspects, objects and advantages of the present invention, will be better understood through the following illustrative and non-limited detailed description, with reference to the appended schematic drawings.

FIGS. 3a-c show pseudo-code describing one embodiment.

FIG. 4b is a block diagram schematically showing a conventional level set based image processing method for comparison with FIG. 4a.

In the drawings the same reference numerals may be used for same, similar or corresponding features, even when the reference numerals refer to features in different embodiments.

DETAILED DESCRIPTION

Although the present solution, as will be recognized by the skilled person, can be used with in principle any kind of image processing method where the level based method can be applied, it may be particularly advantageous to use in the case of shape recognition/recovery in images, in particular image segmentation, and preferably in combination with a narrow band approach.

An embodiment related to segmentation will first be discussed in some detail, including details from implementation and verification:

The inventors noticed that when certain points during propagating move faster than their neighbors, the curvature force will move them backwards to keep the contour (not necessarily but often the contour of 0-level set) smooth, even though the whole neighborhood will eventually move forwards. Such kind of local wiggling behavior slows down the propagation considerably as it repeats. Based on this finding the inventors propose a modified sparse field level set method, which uses a periodic monotonic speed function, resulting in coherent propagation of the boundary. In the level-set method, a dynamic implicit function φ, a signed distance function, represents the object's contour. By iteratively moving this function according to external and internal forces according to a speed function $v_t$, the 0-level set can be deformed to the shape of the interesting object. In most level-set based segmentation applications, the curvature force (intrinsic factor/internal force) is used to keep the contour smooth, whereas the intensity, gradient and texture of the image (extrinsic factors/external force) are used to attract the contour into the border of object. Equation 1 gives a typical example $$\frac{\partial \phi}{\partial t} = v_t \quad \text{(Eq. 1)}$$

where $$v_t = \alpha C(x, t) + (1 - \alpha)D(x)$$

Figure 1A:
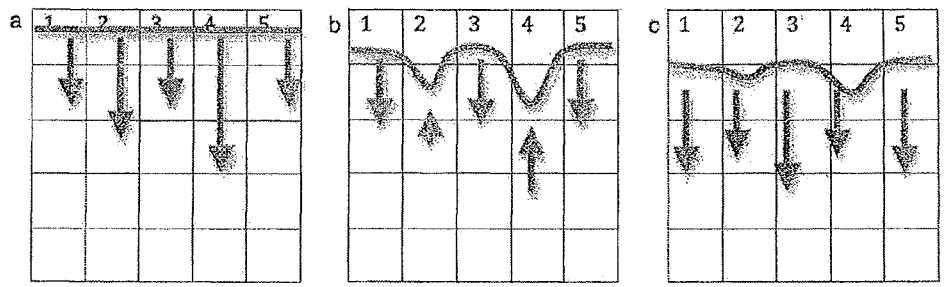
FIG. 1a schematically shows wiggling behavior of neighboring image point in a conventional method.

In Eq. 1, C(x,t) is the local curvature, D(x) is an intensity-based external force. Due to noise and numerical errors, the neighbor points on the 0-level set (the contour) will not propagate at the same pace. Very soon they will form a zigzag shape, even if they start from the same line. See FIG. 1a (a-c). The faster points (point 2 and 4 in FIG. 1a) in the neighborhood will be "pushed" back by the curvature force in the next iteration, while the trend of the local segment is to move forward. This phenomenon is repeated during the level set function's evolution and this "local wiggling" significantly slows down the propagation speed. In the present embodiment it is proposed to replace the conventional speed function with a periodic monotonic function, see Equation 2.

$$\frac{\partial \phi}{\partial t} = w(v_t) \quad \text{(Eq. 2)}$$

where $$w(v_t) = \begin{cases} v_t & (\text{if } v_t \times \text{trend}(x, t) > 0) \\ 0 & (\text{if } v_t \times \text{trend}(x, t) \leq 0) \end{cases}$$

Figure 1B:
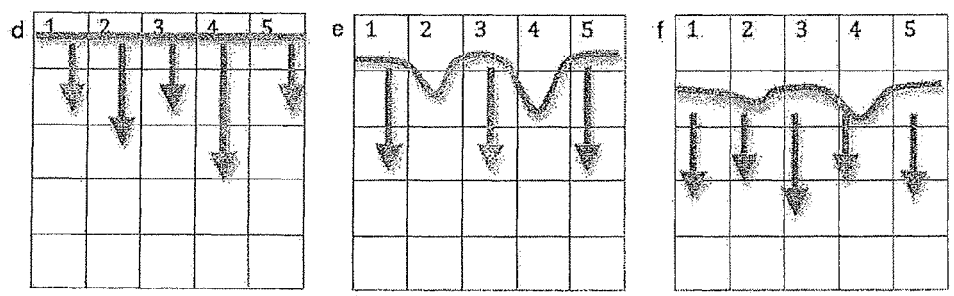
FIG. 1b schematically shows corresponding situation as in FIG. 1a when a method according to embodiments herein is used.

In Eq. 2, "trend" represent whether the local contour is expanding or shrinking. In the present embodiment the value can only be 1 or −1; the speed function $v_t$ is a scalar. The "trend" for each pixel/voxel is here initialized at the first time when it is added into the narrow band, using sign($v_t$) or $$\text{sign}\left(\sum_{x \in N_r} v_{x,t}\right),$$

where $N_r$ is the neighborhood around the point within distance r. In practice, after the first iteration, the "trend" of any new point added into the narrow band need not be calculated. It can instead e.g. inherit the "trend" from the neighbor that caused the value changing. The values of the "trend" need not be the same (although it is preferred) across the image, but they will in the present embodiment change sign at the same time and "trend" will change sign at the end of a period when w($v_t$) is 0 (i.e. $v_t$×trend≤0) for every point on the narrow band. As shown in FIG. 1b (d-f), for comparison with FIG. 1a, using this periodic monotonic speed function, the faster points (point 2 and 4) will not move back due to slower neighbors (because $v_t$×trend<0), but stay in place and wait for the neighbors to catch up. Then, as the contour becomes flat again (FIG. 1b(f)), $v_t$ at point 2 and 4 will have the same sign as trend, and all points can move forward together. The initialization of the trend is not crucial. Even if one point's trend is opposite to the neighbors due to noise, the contour can still propagate around the point and merge again after the point, owing to the level set method's ability to automatically handle topology changes. The left-behind noise island will be eliminated in the next period due to the high curvature. Hence, in this way, the expanding parts of the contour can keep expanding, and the shrinking parts keep shrinking in a coherent manner, until they reach the boundary of the segmented object. As the force related to extrinsic factors will change sign when the contour has crossed the boundary, these parts of the contour can then no longer expand or shrink. At the same time, the curvature force will prevent the contour from growing into corners by changing their sign and never changing back. Then w($v_t$) becomes 0 everywhere on the contour. After trend of each point has changed sign, different parts of the contour will change their propagation direction to compensate for the error caused by their crossing the border in the preceding period. As trend will periodically change its sign, the contour will converge on the border of the object.

Based on the coherent propagation discussed above, the inventors further propose a lazy narrow band level set algorithm which prevents unnecessary/endless computation in points that have reached the border. As the expanding/shrinking trend at these points changes just after several iterations, the computation in the remaining iterations of one period can focus on the actually growing parts. Solving Eq. 1 for every pixel/voxel in the image would be comparatively time consuming. The sparse field level-set algorithm calculates/updates φ only for the pixels/voxels where the 0-level set passes by, and updates their neighbors' level set function (2-3 pixels/voxels away) via a distance transform. This reduces the computation by one order of magnitude. However, in the conventional implementation, all the points on the one pixel wide narrow band need to be updated during each iteration, even if many parts of the contour have converged on the border of the object. With the coherent propagation discussed above, in a single period, if the contour reaches the border, w($v_t$) of that part of contour will become 0. If no neighbor changes it value, w($v_t$) will always return 0 in the remaining iterations in that period. These points can thus be set to "sleep" and stop updating the level set function here. However, as these points may be just in a temporal "equilibrium" (w($v_t$)=0), a wakeup mechanism may be implemented to allow all changed points (w($v_t$)≠0) to wake up sleeping points, e.g. in a 1-2 pixel/voxel wide neighborhood. Moreover, the changed points preferably only wake up neighbor points with the same trend, as it means that the neighbors are catching up. Otherwise they are following further behind, and w(vt) remains 0. At the end of a period, all the sleeping points may be waked up again. When most points are close to the border, they will typically be put to sleep just after a few, such as 1-2, iterations.

The inventors additionally propose a convergence detection method designed to stop updating the local level-set function when the zero 0-level set is considered stationary in a voxel for several periods, and so that the segmentation will stop naturally when all points on the contour are considered stationary. In most sparse field level-set implementations, numerical errors from reinitializing the level-set function (signed distance computation) and from solving the partial differential equation cause the speed $v_t$ to hardly ever converge to 0; instead it keeps jumping around 0 in small steps (mostly less than 1 pixel). When a periodic monotonic speed function is used, the contour will, in most cases, still converge in the same manner, but at certain locations, especially at sharp corners where $v_t$ is dominated by the curvature force, the contour can jump in larger steps. This is caused by the small step jumping of the joint points will allow the elastic region between them to change dramatically. One solution is to switch to a conventional speed function after several periods. However, a more efficient method is to force the elastic region to converge by stopping the update of the level set function permanently on those points where the change in ϕ has been sufficiently small for several periods. A wiggling counter may be used to track how many periods the change in ϕ has been below a given threshold (such as 1.0) in each pixel/voxel. At the end of each period, this counter is increased by 1 for each point on the one pixel wide narrow band (0-level set) when the change in ϕ has been sufficiently small compared to the value at the end of the last period. When the wiggling counter for a point passes a threshold value (such as 10) the, it is set to permanent sleep, that is, is stopped. The value at that point may then be calculated as the mean of the current value and the value at the end of last period.

The above discussed method can be understood to achieve speed-up by skipping unnecessary computation of certain and by speeding up the convergence. For example, the coherent propagation makes the 0-level set approach the border of the object faster. Not only can the faster points avoid moving backwards to wait for their slower neighbors, but also the step length for all points is increased in each iteration by allowing Δt to be somewhat bigger. In all level set algorithms, to ensure the stability of the level set function, it is typically required that Δt×$v_t$ is less than one pixel/voxel unit for all the points on the 0-level set (otherwise the connectivity of the 0-level set can break). When Δt is unified for all points, the algorithm may thus choose the maximum $v_t$ among all the points in the narrow band in each iteration, which limits the Δt to be less than $1/|v_{t-max}|$. However, often the points moving backward will have the highest velocity and Δt may therefore be limited by these points. However, by setting $v_t$ to zero in these points, the absolute value, $|v_{t-max}|$ can be smaller, which makes the remaining points require fewer iterations to move one pixel unit. Additionally, unlike the conventional narrow band or sparse field level set methods, the above discussed lazy narrow band level set algorithm with a new convergence detection method allows to avoid not only computing points that are far away from the 0-level set, but also repeating useless computation on the converged segments of the contour, and instead focus on the actively changing parts.

Figure 2:
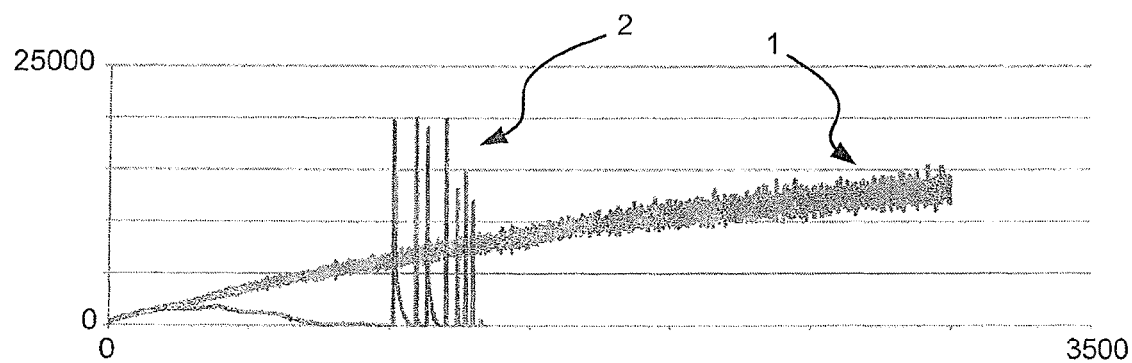
FIG. 2 shows number of iterations and actually computed voxels in each iteration and comparison between a conventional method and a method according to embodiments herein.

FIG. 2 gives a comparison overview of how many points are computed in each iteration, where 2 indicates the situation for the present method and 1 the situation for a sparse field level set algorithm running on the same data with same parameter settings. The segmentation accuracy of the present method appears not sensitive to the threshold set on the wiggling counter, however, in experiments the threshold was typically set to 10 in 2D cases and 5 in 3D cases.

Both 2D and 3D versions of the method discussed above have been implemented as a single-thread application on a Mac Pro with a 2.93 GHz Intel Xeon CPU. The D(x) term in the speed function $v_t$ (Eq. 1) was set to a threshold-based function: D(x)=ϵ−(I(x)−T), where I(x) is the intensity of input image, T is the center of threshold window and ϵ is the width of the windo. 2D synthetic and clinical images were tested and in general 5-15 times speedup was achieved compared with the conventional sparse field level set method. Typical computation time for a 512×512 image was 0.1-0.2 s. With the 3D version, 12 cases of abdominal aorta CTA data were tested. A single seed region was provided for each case. About 10-20 times speedup was achieved. Typical computation time for a 256×256×256 volume was 5-12 s. The difference between our method and the conventional method was measured by comparing the distance (given directly by the level set function) of the points on the one voxel wide narrow band. As the conventional method tends to stop growing earlier than the proposed method, only points around the abdominal aorta trunk were counted. In the 12 datasets from the testad cases, the distance between two 0-level sets varied from −1.80 to 1.46 voxel units (a negative distance means that the contour point from proposed method is outside the contour from conventional method), and the mean signed distance was −0.12 with standard deviation 0.11. The mean unsigned distance (absolute value) between two contours was 0.13 (with standard deviation 0.10, however it is not a normal distribution).

As addition to the period monotonic level set method described above, several possible variations in different steps may be considered. One is to take trend(x,t) to a scale space, which means that trend(x,t) for each pixel is calculated within an r unit wide neighborhood rather than just in the pixel itself. Obviously, when r=1, this method will return the same result as described above. At the other end is when r is defined infinite or at least so large that all pixels are included. This will synchronize the expanding or shrinking for all the points in the narrow band, which means that trend(x,t) is the same for all points, thus eliminating the need to allocate extra memory. This may be convenient for GPU programming, where memory resources are limited. It will also simplify the lazy narrow band algorithm, since when the contour is allowed to expand and shrink at the same time, special caution may be needed at the joint area between expanding and shrinking segments, so that the update will not run into a dead loop and never go to sleep. Experience has shown that such unified period monotonic level set method may give almost the same result as the method discussed above.

In the lazy narrow band algorithm, the changing of trend (x,t) for all pixels is synchronized. In other words, the periods of different pixels are synchronized. However, it is not always necessary to let the pixels that reach the object border wait for distant pixels that have not stopped the propagating yet. A non-synchronized version is also possible where the sleeping pixel enter the next period when all neighbor pixels within an s unit wide neighborhood want to enter next period, even if some points further away than s units are actively propagating in the last period. Such "local periodic monotonic level set" behaves more similar to the conventional level set method than the periodic monotonic level set method discussed above.

Another variation is to replace the binary wiggling counter with a damping factor, so that the velocity gradually slows down instead of suddenly stopping after wiggling a certain number of times. This can be achieved, for example, by limiting the Δt to be less than $s_p/|v_{t-max}|$, where $s_p$ is the maximum step length within period p, and $s_p$ decreases linearly or exponentially from period to period, and $s_0 \leq 1.0$. The computation may stop after a number of periods that may be predetermined or user selected and/or when $s_p$ goes below a threshold that may be predetermined or user selected. The skilled person can, without undue effort, find and select a suitable number of periods and/or threshold in view of the particulars and practical circumstances in each case of application. Another application scenario of level set based image processing is to reduce noise. Prior art methods in this regard is e.g. the "total variation method" (see Osher, S., and Fedkiw, R. P., *"Level set methods and dynamic implicit surfaces", Springer,* 2003) and "anisotropic diffusion filtering" (see G. Gerig, O. Kubler, R. Kikinis, and F. A. Jolesz, *"Nonlinear anisotropic filtering of*

MRI data," *Medical Imaging, IEEE Transactions on* 11, 221-232, 2002). For noise reduction, the input image is taken as an initial level set function, while the speed function is designed to reduce the high curvature (noise) at any level set, unlike in segmentation cases where typically only the 0-level set is relevant. The input image also serves as an external force to prevent the original information being smoothed out over time t. For example, referring to Eq. 1 above, if C(x,t) is the local curvature of $\phi_t$, D(x,t) can be, for example, defined as $\phi_t$–I, and $\phi_0$=I, where I is the input image, so not only the curvature is minimized over time but also the difference between the input and output image is minimized. Using the present method for noise reduction is rather straightforward. The difference compared with the above image segmentation procedure is just all the steps of determining "trend", updating the level set function and forcing the elastic region to converge have to be done on all the image points instead of points on a narrow band.

It should be noted that the speed function in Eq. 1 is merely one example and in a form applicable to both image segmentation and noise reduction, however, the present method is not limited to such speed function. Other speed functions, e.g. such found in related literature, can be used to replace $v_t$ in Eq. 2. Examples of various speed function that may be used with the present method can i.a. be found in the earlier mentioned Osher, S., and Fedkiw, R. P., "*Level set methods and dynamic implicit surfaces*", Springer (2003), chapter 11-12.

Another detailed embodiment, in large parts corresponding to the one described above, is described by pseudo-code in FIGS. 3*a-b*. The pseudo-code provides a comprehensive and efficient description that should be appreciated by the skilled person. FIG. 3*a* shows the main pseudo-code program, while FIGS. 3*b-c* show functions being called by the main pseudo-code program. The pseudo-code will not be explained in any further detail here as the code should be sufficiently clear to the skilled person, especially if read in view of what was discussed above and in the present disclosure as a whole.

Figure 4A:
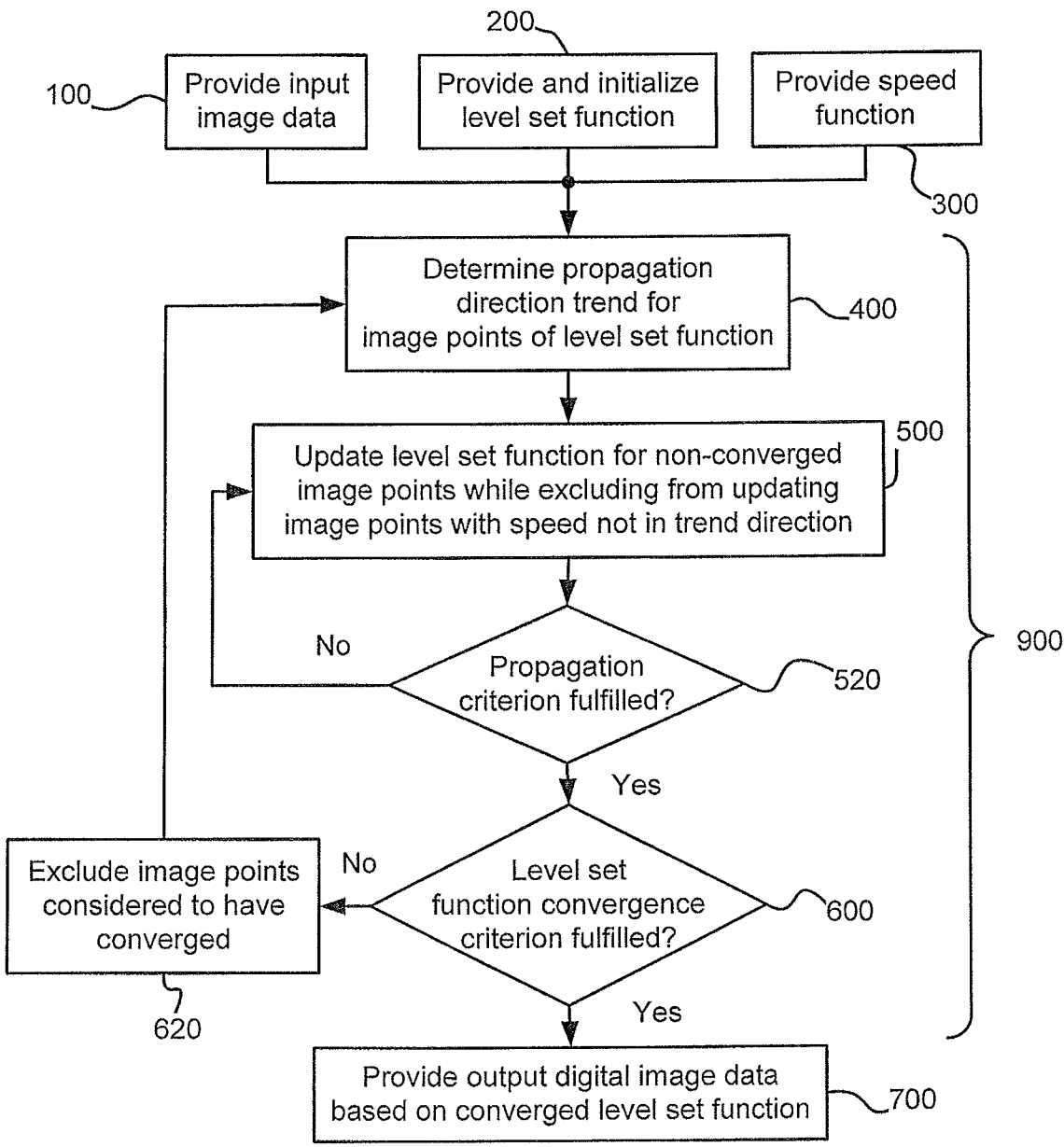
FIG. 4a is a block diagram schematically showing a level set based image processing method according to embodiments herein.

FIG. 4*a* is a block diagram schematically showing a level set based image processing method according to one embodiment of the present solution. In steps 100, 200 and 300, input image data, level set function $\phi$ and speed function $v_t$ are provided. These steps may correspond to what is performed first also in a conventional level set based image processing method. The input image data is typically being input, e.g. read from an image file, e.g. by user interaction, but in case the method is part of an integrated system, it may e.g. be generated from an image acquired through image capturing means. The level set function $\phi$ and the speed function $v_t$ are typically predefined or predetermined according to the type of image processing to be performed, but it is also e.g. possible with one or both of the these functions being input, e.g. through user selection or similar. In connection with step 200, or at least before the level set function is updated, the level set function is initialized, e.g. calculated to initial values or set to predetermined or user input based values.

In step 400 a propagation trend is determined for image points of the level set function. This trend may e.g. involve all image points of the image input data, or subset where the level set function is defined, e.g. in a narrow band. The trend(x,t) discussed previously is one example of a propagation direction trend. The propagation direction trend may comprise information on propagation direction trend for individual image points and is preferably provided in the form of a propagation direction trend map where each image point relevant for the propagation direction trend, typically is represented by a value indicating the propagation direction trend for that image point. In some embodiments the propagation direction trend may initially be determined through user input or initially be predetermined. Often a user can determine a starting position that is beneficial, whereby initial calculations can be avoided. The user input can e.g. involve that a user indicates a seed point/region that for sure is inside or outside an object to be segmented, whereby the initial trend is in an outward (expanding) or inward (shrinking) direction. In case of segmentation the initial trend can e.g. be predetermined inward if for example always starting at the edges of an image. The propagation direction trend may be determined by calculation based on values of the speed function. This may be the case also initially, or only after the propagation direction trend has been determined initially. In some embodiments the propagation direction trend is calculated using the sign of speed determined by the speed function, which e.g. was the case in the detailed embodiment discussed above and also in the embodiment according to the pseudo-code. The propagation direction trend of a respective image point may be calculated based on values of the speed function in the respective image point and/or in a local neighborhood thereof. In the latter case the propagation direction trend of respective image point may be calculated based on a sum of speed function values in a local neighborhood thereof, e.g. as was the case in the pseudo-code embodiment discussed in the foregoing. The direction may be derived from the sign of the resulting speed. By local neighborhood of an image point is typically meant all image points within a determined distance from said image point. This may involve points within a 1-point radius up to every point of the level set function. In the latter case there will be a unified propagation direction trend. In some embodiments the propagation direction trend may be unified. That is, the propagation direction trend will be the same within a period for all image points of the level set function. In some embodiments the propagation direction trend may be unified only locally, in neighborhoods of image points. In cases unified propagation direction trend, one and the same variable may be used to store the propagation direction trend for each unified grouping. The propagation direction trend may provide information whether propagation direction trend is in the trend direction or not, e.g. the propagation direction trend may be binary represented, for example by 1 or −1 as was the case in the initially discussed embodiment.

In step 500, the level set function is updated for non converged image points while excluding from updating image points with speed not in trend direction. The updating, when taking part, may be no different from updating of the level set function in conventional methods, that is, involves updating using the speed function etc. In some embodiments, the level set function may be updated also for converged points, and there may be embodiments without exclusion (in some or all of subsequent iterations) in the updating of image point with speed not in the propagation trend direction. For example, in some embodiments the level set function is updated using the speed function and the propagation direction trend, so that the speed function is excluded from contributing in the updating of the level set function in image points where the speed of the speed function is not in trend direction according to the propagation direction trend. One example of this is the function w($v_t$) described in Eq. 1, and an advantage is that the previously explained wiggling problem can be avoided. However, it is typically more efficient, similar as in the embodiment of FIG. 4*a*, to accomplish this simply by excluding from the updating image points considered to have converged and/or image points with speed that is not in trend direction according to the propagation direction trend. An additional advantage with this is that also the number of computations can be reduced, further speeding up the method. How to determine whether speed is in a trend direction according to the propagation direction trend or not, can be accomplished in a number of ways as realized by the skilled person. One efficient solution has been shown in the foregoing (see the first discussed embodiment), where the trend direction were represented by −1 or 1 at each image point, in turn representing the two possible directions (e.g. expanding or shrinking trend). The trend may then be multiplied with the speed function value and since the sign of the speed function determines the direction, result >0 means that the speed is in the trend direction and the level set function is updated using the speed function for such image point, and if the result is <=0, the level set function is not updated. Another option is shown in the pseudo-code embodiment where the propagation direction trend is stored as a sign which then simply can be compared to the sign of the speed function. In the previous embodiments discussed, image point not having a speed in the trend direction was set to status sleep. In some embodiments, in a step 500 corresponding to the one in FIG. 4*a*, the level set function of an image point that would be excluded according to the previously discussed criterion is still updated using the speed function if such image point is located in a local neighborhood of an image point that was updated. In the previously discussed embodiments, such image points were said to be wake up, and set to active (again) after temporal sleep.

Still referring to FIG. 4*a*, in a step 520, it is checked whether a propagation criterion is fulfilled or not. If not, the level set function is continued to be updated in line with was described above in connection with step 500.

The propagation criterion may e.g. be based on how many image points are being excluded in the previous step 500 and/or based on the number of iterations that has been performed. For example, in the pseudo-code example, the propagation criterion was that all image points should have sleep-status or stopped-status. When the propagation criterion is fulfilled, this means that one update period has ended and next step is 600.

In step 600 it is checked if a level set function convergence criterion is met. If it is met, this means that the level set function as a whole is considered to have converged. If not fulfilled, a new update period starts by (re)determining the propagation direction trend in step 400, and step 500 is again performed, similarly as already discussed but now in the new period and using the new determined propagation direction trend. In some embodiments there may be only one period. The updating in the new period may focus on non-converged image points, by excluding in a step 620 image points considered to have converged. The image points may be considered to have converged when fulfilling an image point convergence criterion. In other embodiments no such exclusion is made, and only level set function convergence is checked. However, it may be efficient to exclude individual image points considered to have converged since further calculations in such image points typically is unnecessary. The image point convergence criterion may be considered fulfilled when the level set function has changed less than a convergence threshold value (typically small) during a number of previous update periods. Each update period ends when the propagation criterion is fulfilled. The convergence threshold value can be determined and tuned by the skilled person depending on the situation where the method is to be applied. Also the number of previous update periods can be determined and tuned by the skilled person depending on the situation where the method is to be applied; however, typically the number of previous update periods may be about 5-15. In the previously discussed embodiments, the so called wiggling counter has been used for checking whether the image point convergence criterion is considered fulfilled. For example, in the pseudo-code embodiment, if $\Delta\phi$ is less than a convergence threshold value $\epsilon$, the wiggling counter is increased by one, else set to zero. When the wiggling counter reach above a number n, corresponding to the number of previous update periods where the level set function has changed less than a convergence threshold value, the level set function in the corresponding image point is considered to have converged. The level set function of image points fulfilling the image point convergence criterion may be set to a value based on recent level set function values, such as an average of a present and a preceding level set function value. In the pseudo-code embodiment, this is accomplished by setting the level set function value to an average between the present and the directly preceding value.

The level set function may be thus be updated as described above in an iterative manner by the steps indicated by reference numeral 900 in FIG. 4, until the level set function convergence criterion is fulfilled. The level set function convergence criterion may be based on how many, preferably that substantially all, image points of the level set function are fulfilling the image point convergence criterion. In the pseudo-code embodiment, the while-do loop in the main program corresponds to the level set function convergence criterion; the loop continues until all points are stationary (stationary points corresponds to such considered to have converged, that is, such fulfilling the image point convergence criterion).

Figure 4B:
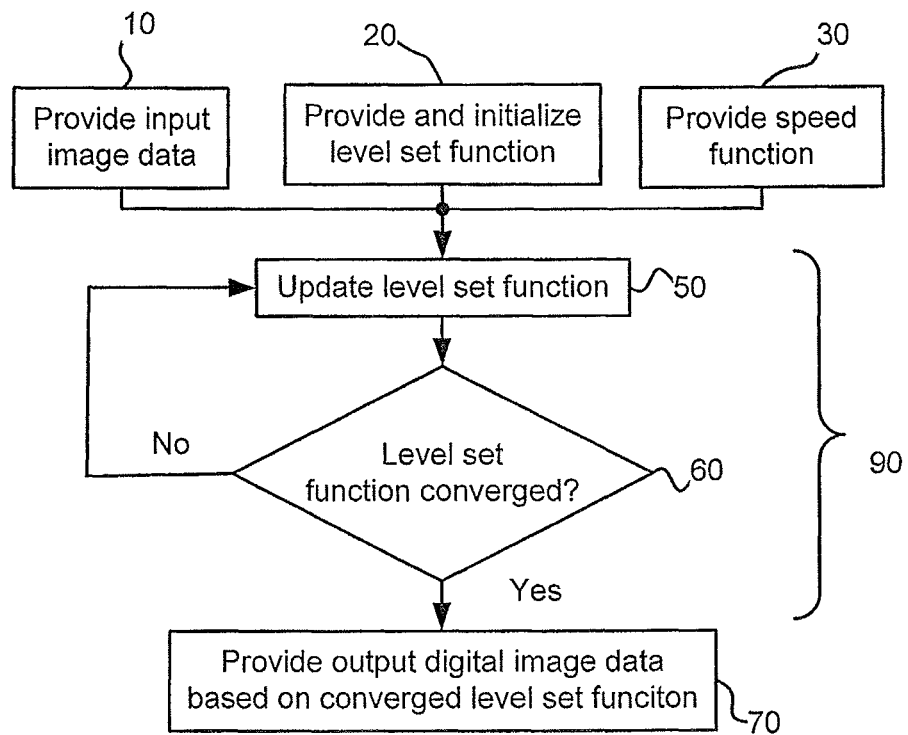

When the level set function convergence criterion is fulfilled, the level set function is considered to have converged and the resulting level set function values are being used in a step 700 to provide output image data. Exactly how this is accomplished may differ depending on what kind of image processing the present method is being used for. In general, step 700 may be in accordance with handling of converged level set function values when a conventional method would be used. As should be recognized by the skilled person, the present method mainly concerns what is being carried out between input and output steps, for example, with reference to FIG. 4*a*, the present method mainly concerns steps corresponding to those indicated by 900 in FIG. 4*a*, rather than the preceding and subsequent steps. FIG. 4*b* is a block diagram schematically showing a conventional level set based image processing method for comparison with the embodiment shown in FIG. 4*a*. Steps in FIG. 4*b* that corresponds at least partly to steps in FIG. 4*a* are: 10 and 100, 20 and 200, 30 and 300, 40 and 400, 60 and 600 and 70 and 700. Basically the inputs and the outputs may be the same, that is the difference is rather in the kernel part, that is, blocks inside the braces numbered 90 and 900 in FIGS. 4*a-b*. However, as has been previously indicated, also the kernel part is based and thus has many similarities with the conventional method, e.g. how the level set function is updated using the speed function (inside steps 60 and 600), although when and where this is to be done differs. It can be understood that the present method can be viewed upon as being based on a conventional method in general, adding features to it.

In general, in embodiments where the method is an image segmentation method, the output digital image data represents a boundary of an object in the image represented by the input digital image data and the level set function is preferably being updated only in a narrow band comprising the 0-level, such as in conventional narrow-band approaches. In embodiments, in particular such where the present method is used with a narrow-band approach, the step of updating the level set function, such as described above in connection with step 500 of FIG. 4a, may further comprise detecting new image points added to the narrow band and updating the propagation direction trend in regard of the new points, and inheriting the one or more trend directions associated with the new image points from neighboring image points. The neighboring image points being such updated by the level set function and thereby caused the new image points to be added to the narrow band. In other embodiments, also in particular such where the present method is used with a narrow-band approach, the propagation criterion, such as described above in connection with step 520 of FIG. 4a, is considered fulfilled when new image points has been added to the narrow band through updating of the level set function, such as in step 500 of FIG. 4a. By the above discussed variants, there will be (re)determination, i.e. an update, of the propagation direction trend so that any new point added to the narrow band will be ensured to get a trend direction of the propagation direction trend associated with it. Thereafter the level set function can be updated in the new points using the propagation direction trend, such as in step 500 of FIG. 4a. It can be understood that such handling may not be needed, even in a narrow band approach, if the propagation direction trend already has been determined for image points outside the narrow band.

In general, in embodiments where the method is an image noise reduction method, the output digital image data represents a smoothed, noise reduced, image of the image represented by the input digital image data.

Figure 5A:
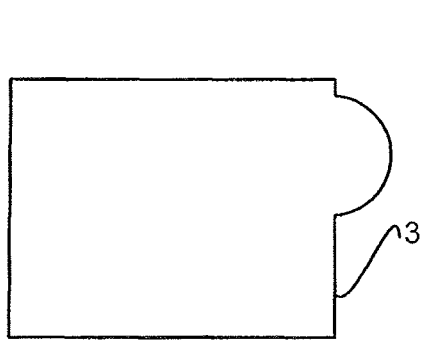
FIGS. 5a-d schematically show results from level-set based image segmentation employing a shape model.
Figure 5B:
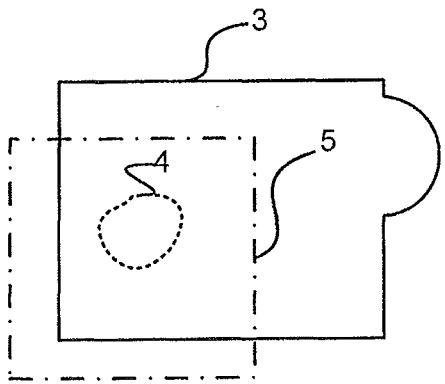
Figure 5C:
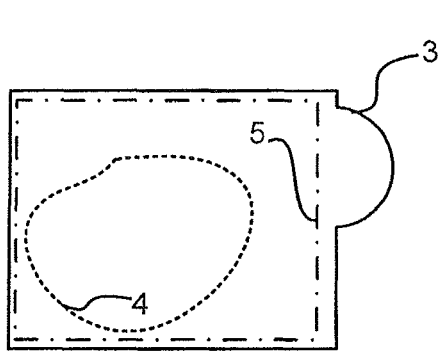
Figure 5D:
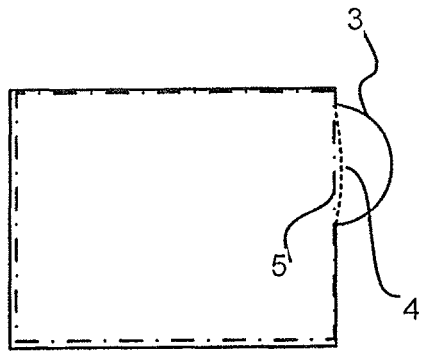

One advantage with level-set based image segmentation methods in general is the ability to prevent leaking to nearby objects via small gaps with the curvature force. However in some cases, when two objects of similar intensity attach to each other, the gap on the object border can be rather big. See example in FIG. 5a where a rectangle is attached to a circle. Conventional level-set methods typically fail to distinguish them no matter how the curvature factors are set. In M. E. Leventon, W. E. Grimson, and O. Faugeras, "*Statistical shape influence in geodesic active contours,*" in Computer Vision and Pattern Recognition, 2000. Proceedings. IEEE Conference on, vol. 1, pp. 316-323, 2002, this issue was solved by using a statistical shape model to constrain the level set evolving. The statistical shape model, a so-called shape prior, is represented by the mean of several known binary shapes (u), and their principle components' variation (a). In each iteration of the level set evolution, a transformed shape (u*|a, p; p is the rigid transform parameters of transferring, rotating and scaling), that best fit the current object is computed via a maximum a posteriori probability (MAP) estimate, and the level set evolving is punished if the contour is too far away from u*. FIGS. 5a-d gives an illustrative example. Two objects, a rectangle and a circle form a shape 3, however, it is desirable to be able to segment out the rectangle, utilizing some prior knowledge of its shape. In FIG. 5b an initial level set function seed region 4 and a shape prior 5 is shown. In FIG. 5c, the situation is shown after a number of iterations, and in FIG. 5d, the final result, where the level set function 4 has been made to converge very close to the actual border of the rectangle by using the shape prior 5.

Many variations of level-set based image segmentation methods that are shape-based have been proposed, such as Y. Chen et al., "*Using prior shapes in geometric active contours in a variational framework,*" International Journal of Computer Vision, vol. 50, no. 3, pp. 315-328, 2002, and A. Tsai et al., "*A shape-based approach to the segmentation of medical imagery using level sets,*" IEEE Transactions on Medical Imaging, vol. 22, no. 2, pp. 137-154, 2003. Although they employ different shape prior generating methods, different rigid shape registration (fitting/transforming) approach and different shape-prior-guided speed function, their general workflows are the same.

Figure 6A:
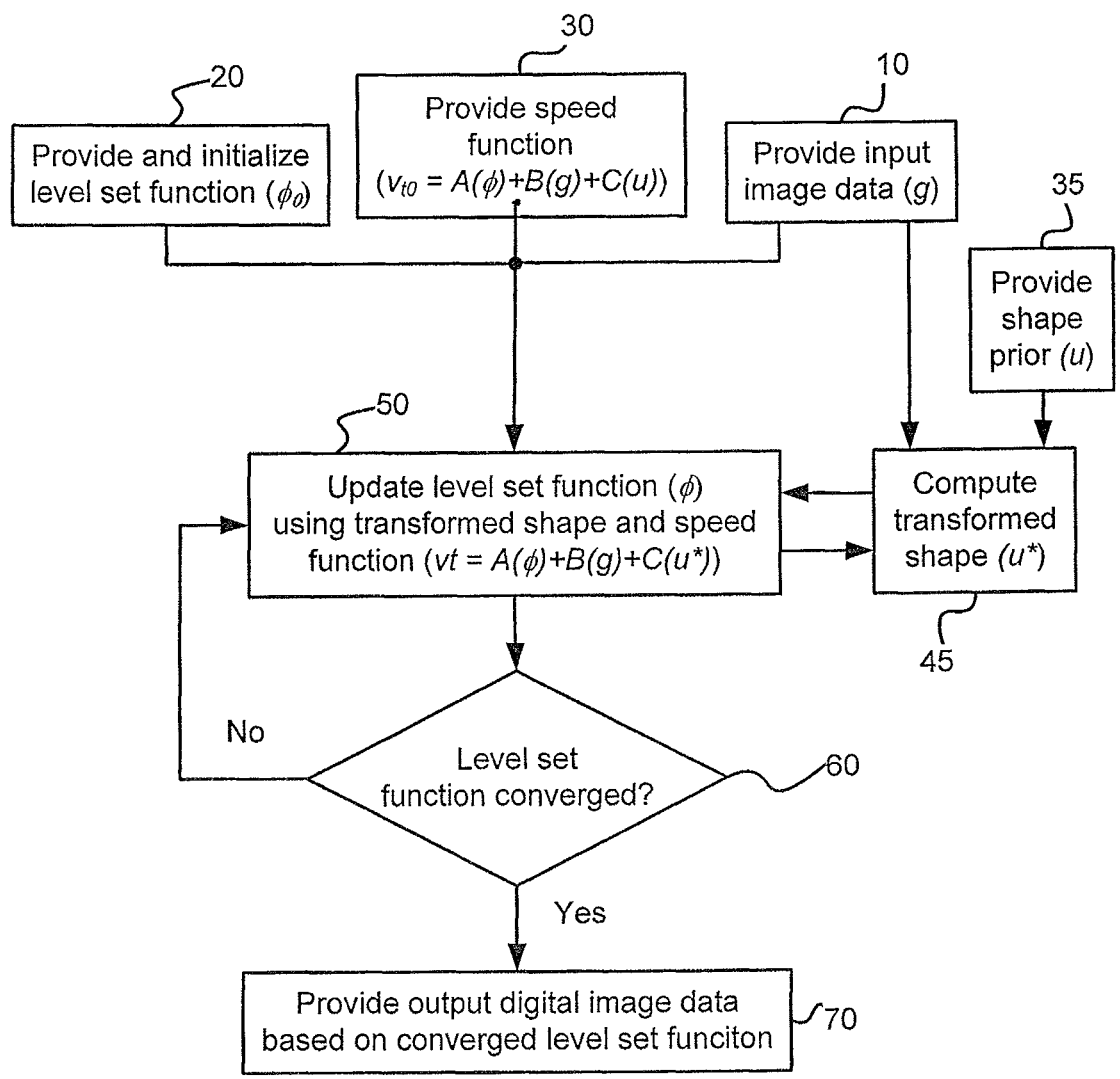
FIG. 6a is a block diagram schematically showing a conventional level set based image processing method that is shaped based.

FIG. 6a is a block diagram schematically showing a conventional level set based image processing method, as was shown in FIG. 4b, modified into a shaped-based level set based method, illustrating the general workflow. In the following only differences following from the modification will be discussed. Hence, the general principle is that shape prior is provided (in step 35). The shape prior is used in a step 45 together with the input image data and the level set function to compute a transformed shape. The transformed shape is, via the speed function, used in updating of the level set method in step 50.

One problem with the shape-based image segmentation is that it is slow in general, this since the shape registration steps are performed in each iteration. Even in a narrow-band approach, where the matching is only done for the image points that are in the narrow band, the performance is not satisfactory with 3D medical data. However, the present method, as discussed in the foregoing, can be advantageously used as a shape-based level-set based image segmentation method and combining the shape model into the method is straightforward. As the present method converges much faster than the conventional level set, it increases speed even without optimization. Hence, the general principle is that a shape prior is provided (in step 35) and used in a step 45 together with the input image data and the level set function to compute a transformed shape. The transformed shape is then, via the speed function, used in updating of the level set method in step 50.

Figure 6B:
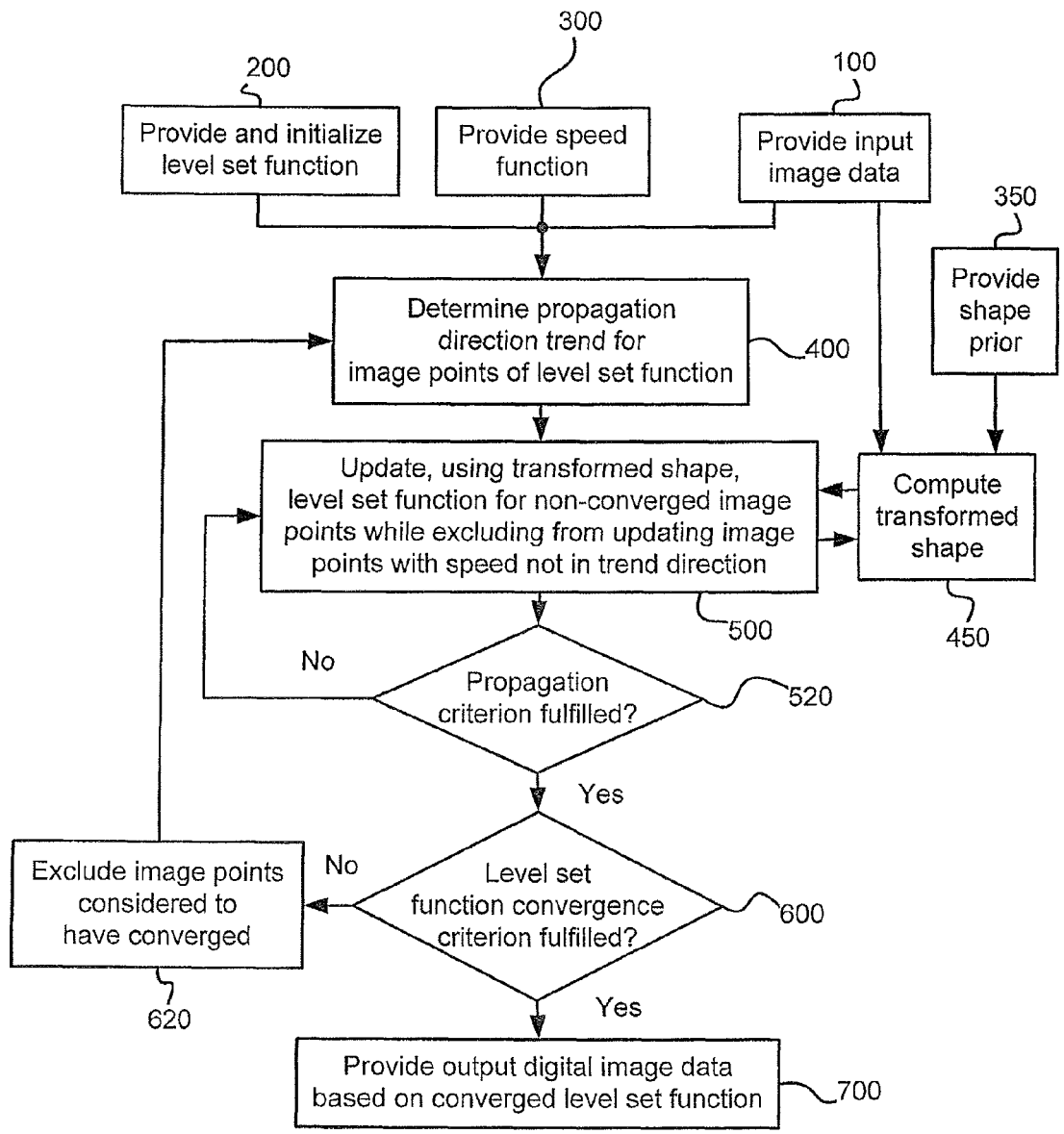
FIG. 6b is a block diagram schematically showing an embodiment that is shape based.

FIG. 6b is a is a block diagram schematically showing a shape-based level set based image segmentation method according to one embodiment of the present solution. The shown embodiment is based on the embodiment shown in FIG. 4a, modified to be shape based. For convenience, the following will focus only on the differing parts. (It can be noted that the modification to make the method shaped based resembles the modification discussed above in connection with FIG. 6a.) In a step 350 a shape prior is provided, which is used in a step 450 together with the input image data and the level set function to compute a transformed shape. The transformed shape is, via the speed function, used in updating of the level set method in step 500.

In context of the present method, shape-based segmentation may be further optimized. In the conventional shape-based image segmentation methods, all points on the narrow band are used for image registration, i.e. computing the transformed shape, and has to be repeated in every iteration, see e.g. the loop in the workflow shown in FIG. 6a. However, the method according to the present disclosure allows, through the propagation direction trend, detection of early converged points when they reach the boundary (when their speed is no longer in the trend direction). Hence, the transformed shape may be computed for image points having speed that is not in the trend direction and can be skipped for the other. It not only reduces the computation by excluding actively changing points, but also increases the stability of the registration as the active part of the contour will continue to change in the next iteration.

Additional speed-up may be accomplished by taking a decision to start computing the transformed shape based on whether there has been any change, or a substantial change, in the speed of image points in relation to the trend direction compared to a previous iteration of step 500. For example, only when there is at least a 10% change. As can be expected, in the beginning, computations will be started very often, but the frequency decreases as more and more points converge. This is in accordance with the fact that the shape is almost perfectly registered near the end of the segmentation.

Figure 7:
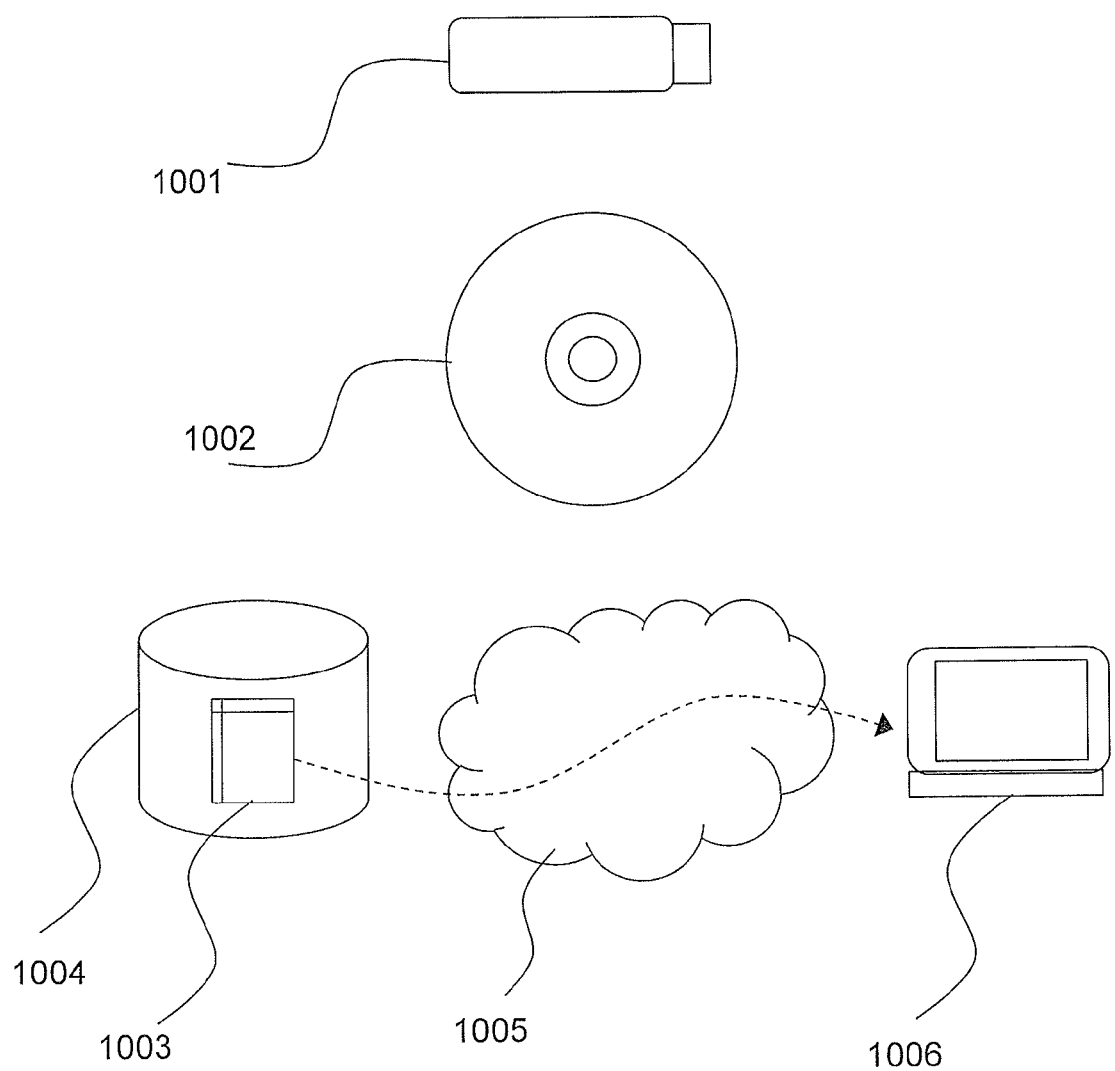
FIG. 7 schematically shows examples that relate to a computer program implementation.

Refer now to FIG. 7. The method according to embodiments herein as described above may be implemented by a computer program product, loadable into the internal memory of a computer, comprising software for executing steps of the method. For example may the computer program product be executable file 1003 stored on a hard drive or other storage means 1004 for example of a server, and may be retrievable therefrom via a network 1005, such as the Internet, and downloaded to a computer 1006 which may be the computer for the execution, or an intermediate computer for intermediate storage and further distribution. The computer program product may also be stored on a memory stick 1001 or a disc 1002, such as CD or DVD, just to mention some examples. The memory stick 1001 and the disc 1002 are also examples of a computer readable medium, which have a program recorded thereon, where the program is arranged to make the computer execute steps of the method according to embodiments herein as discussed in the foregoing.

Figure 8:
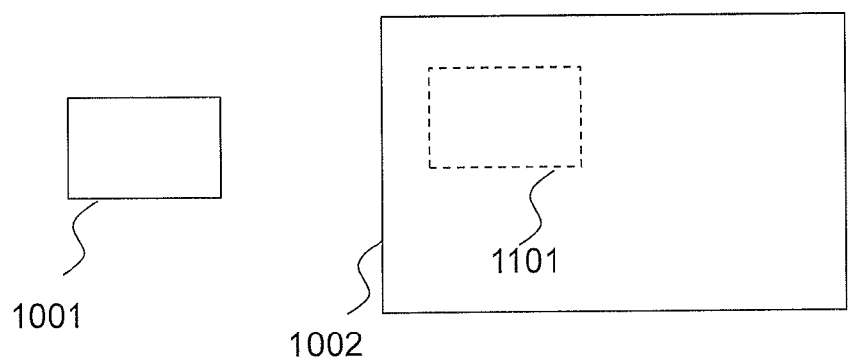
FIG. 8 schematically shows a computer and medical imaging system.

FIG. 8 schematically depicts a computer 1101 and a medical imaging system 1102, such as Magnetic Resonance (MR) imaging system or a Computerized Tomography (CT) imaging system. As should be recognized, the method according to embodiments herein may be implemented e.g. by configuring the computer 1101 to carry out the steps of the method. The implementation may involve a computer program, such as discussed above, loadable into the internal memory of the computer, the computer program comprising software for controlling the steps of the method when the program is run on the computer. The computer program may be recorded on a computer readable medium. The computer 1101 may be part of, such as integrated in, the medical imaging system 1102.

Any illustration and description in the drawings and in the foregoing description are to be considered exemplary and not restrictive. The invention is not limited to the disclosed embodiments. For example, further examples of speed functions can be found in the prior art and speed functions from conventional level-set based image processing methods may be used with the present invention.

The present invention is defined by the claims and variations to the disclosed embodiments can be understood and effected by the person skilled in the art in practicing the claimed invention, for example by studying the drawings, the disclosure, and the claims. Use of the word "comprising" in the claims does not exclude other elements or steps, and use of the article "a" or "an" does not exclude a plurality. Occurrence of features in different dependent claims does not per se exclude a combination of these features. Any method claim is not to be construed as limited merely because of the presentational order of the steps. Any possible combination between independent steps of any method claim shall be construed as being within scope, although the independent steps are, and by necessity has to be, occurring in some order. Any limitation in regard of step order should only follow from what may be required owing to feature dependencies between the steps. Any reference signs in the claims are for increasing intelligibility and shall not be construed as limiting the scope of the claims.

The invention claimed is:

1. A computer-implemented method of processing input digital image data representing an image into output digital image data, comprising:

providing, by a computer system, input image data;
providing and initializing a level set function representation for approximating the output digital image data;
providing a speed function;
determining, by the computer system, a propagation direction trend map relating to image points of the level set function, said map comprising one or more trend directions associated with said image points so that each one of said image points has an associated trend direction;
updating the level set function using the speed function and the propagation direction trend map, so that the speed function is excluded from contributing in the updating of the level set function in image points for which the speed of the speed function is not in the associated trend direction; and
providing, by the computer system, the output digital image data image based on the level set function.

2. The computer-implemented method of claim 1, wherein the updating of the level set function is repeated at least once.

3. The computer-implemented method of claim 1, wherein the updating of the level set function is repeated until a propagation criterion is fulfilled.

4. The computer-implemented method of claim 3, wherein the propagation criterion is based on how many image points are being excluded in the updating of the level set function and/or the number of iterations being performed in the updating of the level set function.

5. The computer-implemented method of claim 3, wherein fulfilling the propagation criterion comprises that a predetermined or user input determined amount of image points is excluded in the updating of the level set function and/or that a predetermined or user input determined number of iterations is performed in the updating of the level set function.

6. The computer-implemented method of claim 1, wherein the updating of the level set function further comprises that image points for which the speed of the speed function is not in the associated trend direction are being excluded in the updating of the level set function.

7. The computer-implemented method of claim 1, wherein the updating of the level set function further comprises that the level set function of an image point that would be excluded is still updated using the speed function if such image point is located in a local neighborhood of an image point that was updated, preferably by having speed in the associated trend direction.

8. The computer-implemented method of claim 1, wherein the propagation direction trend map is at least initially determined through user input or is at least initially predetermined.

9. The computer-implemented method of claim 1, wherein the one or more trend directions of the propagation direction trend map are determined by calculation based on values of the speed function.

10. The computer-implemented method of claim 1, wherein the one or more trend directions of the propagation direction trend map are calculated using the sign of speed determined by the speed function.

11. The computer-implemented method of claim 1, wherein the one or more trend directions of the propagation direction trend map are calculated based on values of the speed function in associated image points and/or in a local neighborhood thereof.

12. The computer-implemented method of claim 1, wherein the propagation direction trend map comprises one trend direction associated with all or a group of said image points.

13. The computer-implemented method of claim 1, further comprising:
repeating the determining of the propagation direction trend map and the updating of the level set function at least once.

14. The computer-implemented method of claim 13, wherein the determining of the propagation direction trend map following the repeating in the determining of the propagation direction trend map and the updating of the level set function, comprises changing at least one of the one or more trend directions.

15. The computer-implemented method of claim 14, wherein the changing involves switching to opposite direction by switching sign of values representing the one or more trend directions.

16. The computer-implemented method of claim 13, wherein the repeating in the determining of the propagation direction trend map and the updating of the level set function involves that image points fulfilling an image point convergence criterion are being excluded from the updating.

17. The computer-implemented method of claim 16, wherein the image point convergence criterion is fulfilled when the level set function has changed less than a threshold value, that is either predetermined or user input determined, during one or more previous updates.

18. The computer-implemented method of claim 13, wherein the repeating of the determining of the propagation direction trend map and the updating of the level set function further comprises setting the level set function for all image points of the level set function or image points fulfilling the image point convergence criterion to a value based on recent level set function values.

19. The computer-implemented method of claim 13, wherein the repeating of the determining of the propagation direction trend map and the updating of the level set function is repeated at least once or until a level set function convergence criterion is fulfilled.

20. The computer-implemented method of claim 19, wherein the level set function convergence criterion is fulfilled based on one or more of: i) how many image points of the level set function are fulfilling the image point convergence criterion and ii) the number of iterations performed in the repeating the determining of the propagation direction trend map and the updating of the level set function.

21. The computer-implemented method of claim 19, wherein fulfilling the level set function convergence criterion comprises that a predetermined or user input determined amount of image points of the level set function are fulfilling the image point convergence criterion or that a predetermined or user input determined number of iterations have been performed in the repeating of the determining the propagation direction trend map and the updating of the level set function.

22. The computer-implemented method of claim 1, wherein the method of processing input digital image data representing an image into output digital image data is an image segmentation method, wherein the output digital image data represents a boundary of an object in the image represented by the input digital image data.

23. The computer-implemented method of claim 22, wherein the level set function is being updated only in a subset of image points.

24. The computer-implemented method of claim 23, wherein the updating of the level set function further comprises detecting new image points added to the subset and updating the propagation direction trend map in regard of the new points and inheriting one or more trend directions to be associated with the new image points from neighboring image points for which the level set function were updated and thereby caused the new image points to be added to the subset.

25. The computer-implemented method of claim 23, wherein the propagation criterion is considered fulfilled when new image points have been added to the subset by the updating in the step of updating the level set function.

26. The computer-implemented method of claim 22, further comprising providing a shape prior; and wherein the updating of the level set function further comprises computing a transformed shape based on the shape prior and using the transformed shape in the updating of the level set function.

27. The computer-implemented method of claim 26, wherein the updating of the level set function further comprises computing the transformed shape in image points for which the speed of the speed function is not in the associated trend direction.

28. The computer-implemented method of claim 26, wherein in the updating of the level set function, a decision to start computing the transformed shape is based on whether there has been any change, or any substantial change, in the speed of image points in relation to their associated trend directions, compared to a previous iteration.

29. The computer-implemented method of claim 1, wherein the method of processing input digital image data representing an image into output digital image data is an image noise reduction method, wherein the output digital image data represents a smoothed, noise reduced, image of the image represented by the input digital image data.

30. The computer-implemented method of claim 1, wherein the computer system comprises a medical imaging system.

31. The computer-implemented method of claim 30, wherein the medical imaging system comprises a magnetic resonance imaging system.

32. The computer-implemented method of claim 30, wherein the medical imaging system comprises a computerized tomography imaging system.

33. A computer program product tangibly embodied on a non-transitory computer readable medium storing instructions that, when executed, cause one or more computer processors to perform operations comprising:
providing input image data;
providing and initializing a level set function representation for approximating the output digital image data;
providing a speed function;
determining a propagation direction trend map relating to image points of the level set function, said map comprising one or more trend directions associated with said image points so that each one of said image points has an associated trend direction;
updating the level set function using the speed function and the propagation direction trend map, so that the speed function is excluded from contributing in the updating of the level set function in image points for which the speed of the speed function is not in the associated trend direction; and
providing the output digital image data image based on the level set function.

34. A computing device that comprises one or more processors and memory, the computing device programmed to process input digital image data representing an image into output digital image data, wherein the computing device is programmed to:
provide input image data,
provide and initialize a level set function representation for approximating the output digital image data, provide a speed function, determine a propagation direction trend map relating to image points of the level set function, said map comprising one or more trend directions associated with said image points so that each one of said image points has an associated trend direction, update the level set function using the speed function and the propagation direction trend map, so that the speed function is excluded from contributing in the updating of the level set function in image points for which the speed of the speed function is not in the associated trend direction, and provide the output digital image data image based on the level set function.

* * * * *